(12) United States Patent
Sim (10) Patent No.: US 9,715,797 B2
(45) Date of Patent: Jul. 25, 2017

(54) EVENT NOTIFICATION METHOD AND APPARATUS THEREFOR

(71) Applicant: Hyundai Motor Company, Seoul (KR)

(72) Inventor: Hyun Chul Sim, Suwon (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 14/731,438

(22) Filed: Jun. 5, 2015

(65) Prior Publication Data

US 2016/0358427 A1    Dec. 8, 2016

(30) Foreign Application Priority Data

Dec. 16, 2014    (KR) ........................ 10-2014-0180960

(51) Int. Cl.
| | | |
|---|---|---|
| H04B 3/36 | (2006.01) | |
| G08B 6/00 | (2006.01) | |
| G06F 3/01 | (2006.01) | |
| G01C 21/36 | (2006.01) | |

(52) U.S. Cl.
CPC ........... *G08B 6/00* (2013.01); *G01C 21/3626* (2013.01); *G06F 3/016* (2013.01)

(58) Field of Classification Search
CPC ........ G08B 6/00; H04M 19/047; G06F 3/016; G01C 21/3626
USPC ....................................... 340/407.1; 455/567
See application file for complete search history.

(56) References Cited

U.S. PATENT DOCUMENTS

| | | | | |
|---|---|---|---|---|
| 8,077,019 | B2 * | 12/2011 | Hofmann | H04M 19/04 340/407.1 |
| 8,131,252 | B2 * | 3/2012 | Soh | H04M 1/72569 455/567 |
| 8,836,502 | B2 * | 9/2014 | Culbert | H04M 1/72569 455/567 |
| 8,847,734 | B2 * | 9/2014 | Ronkainen | H04M 19/04 340/7.56 |
| 9,280,882 | B2 * | 3/2016 | Lee | G08B 6/00 |
| 9,383,820 | B2 * | 7/2016 | Fleizach | G06F 3/016 |

FOREIGN PATENT DOCUMENTS

| | | |
|---|---|---|
| KR | 10-0793079 B1 | 1/2008 |
| KR | 10-2008-0026979 A | 3/2008 |
| KR | 10-1211622 | 6/2012 |
| KR | 10-2012-0084510 A | 7/2012 |
| KR | 10-1402043 B1 | 5/2014 |
| KR | 10-2014-0097902 | 8/2014 |
| KR | 10-2014-0100051 A | 8/2014 |
| WO | 2008-0147622 A2 | 12/2008 |
| WO | 2012-0167098 A1 | 12/2012 |

* cited by examiner

*Primary Examiner* — John A Tweel, Jr.
(74) *Attorney, Agent, or Firm* — Mintz Levin Cohn Ferris Glovsky and Popeo, P.C.; Peter F. Corless (57) ABSTRACT

The present disclosure provides an event notification system including: a controller that senses a command to select a first event among a plurality of events and generates a first vibration pattern corresponding to the selected first event; and a memory that stores the generated first vibration pattern corresponding to the selected first event.

15 Claims, 4 Drawing Sheets

| WRIST MOTION | VIBRATION PATTERN | VIBRATION INTENSITY |
|---|---|---|
| CLOCKWISE ROTATION | CONTINUOUS VIBRATION FOR 100ms | STRONG |
| COUNTER CLOCKWISE ROTATION | CONTINUOUS VIBRATION FOR 100ms | RANDOM INTENSITY |
| MOVE LEFT | VIBRATION AT INTERVAL OF 10ms | WEAK |
| MOVE RIGHT | VIBRATION AT INTERVAL OF 10ms | MEDIUM |

EVENT NOTIFICATION METHOD AND APPARATUS THEREFOR

CROSS-REFERENCE TO RELATED APPLICATION

This application claims priority to and the benefit of Korean Patent Application No. 10-2014-0180960, filed on Dec. 16, 2014, which is hereby incorporated by reference as if fully set forth herein.

BACKGROUND

Technical Field

The present disclosure relates generally to an event notification method and an apparatus therefor and, more specifically, to generating a vibration pattern per event as desired by a user that may be generated in a vehicle and announcing the corresponding event using the generated vibration pattern.

Discussion of the Related Art

With the development of wearable devices such as smart watches, smart glasses, and the like, many users use digital devices (e.g., a cellular phone, a tablet, PC, etc.) in connection with the wearable devices. A user can immediately recognize generation of an event in a digital device through a wearable device by receiving a notification (e.g., vibration, alarm, etc.) about the event generated in the digital device through the wearable device, even without carrying the digital device. However, since notifications, such as a vibration, generated from the wearable device have a fixed output pattern irrespective of event type, the user may not be aware of the particular event, despite recognizing that an event in general has occurred.

SUMMARY OF THE DISCLOSURE

The technical problems solved by the present disclosure are not limited to the above technical problems and those skilled in the art may understand other technical problems solved by the present disclosure from the following description.

An object of the present disclosure is to provide techniques by which a user can conveniently generate a vibration pattern corresponding to each specific event generated in a vehicle. Another object of the present disclosure is to provide techniques for generating a notification of an event through a wearable device paired with a vehicle using a vibration pattern corresponding to the event when the event is generated in the vehicle.

According to embodiments of the present disclosure, an event notification system includes: a controller that senses a command to select a first event among a plurality of events and generates a first vibration pattern corresponding to the selected first event; and a memory that stores the generated first vibration pattern corresponding to the selected first event.

The controller may display graphic data corresponding to the first vibration pattern on a display when the first vibration pattern is generated.

The controller may generate the first vibration pattern based on a command received through a user input unit.

The controller may display a guide message on a display for generating the first vibration pattern corresponding to the first event when the first event is selected.

The command received through the user input unit may include a command to select a vibration intensity.

The controller may sense a command to select a second event among the plurality of events and generates a second vibration pattern corresponding to the selected second event, and the memory may store the generated second vibration pattern corresponding to the selected second event. The second vibration pattern may differ from the first vibration pattern.

The event notification system may further include an RF communication unit. The controller may control the RF communication unit such that the RF communication unit establishes RF communication with a wearable device and transmits, to the wearable device, information stored in the memory relating to the first vibration pattern corresponding to the first event, upon sensing generation of the first event.

The controller may display icons corresponding to the plurality of events on a display, and the command to select the first event among the plurality of events may be based on a selection of an icon corresponding to the first event among the displayed icons.

Furthermore, according to embodiments of the present disclosure, an event notification method includes: establishing RF communication with a wearable device; sensing a command to select a first event among a plurality of events; transmitting a first signal requesting generation of a vibration pattern to the wearable device; receiving a second signal including information relating to a generated first vibration pattern from the wearable device; matching the generated first vibration pattern to the selected first event; and storing the generated first vibration pattern in a memory.

The event notification method may further include displaying graphic data corresponding to the first vibration pattern.

The wearable device may store mapping data that maps motions of the wearable device, sensed through a gyroscope sensor, to predetermined vibration patterns.

The event notification method may further include displaying a guide message for generating the first vibration pattern corresponding to the first event when the first event is selected.

The event notification method may further include: sensing a command to select a second event among the plurality of events; transmitting a third signal requesting generation of a vibration pattern to the wearable device; receiving a fourth signal including information relating to a generated second vibration pattern from the wearable device; matching the generated second vibration pattern to the selected second event; and storing the generated second vibration pattern in the memory. The second vibration pattern may differ from the first vibration pattern.

The event notification method may further include: sensing generation of the first event; and transmitting, to the wearable device, information stored in the memory relating to the first vibration pattern corresponding to the first event, upon sensing the generation of the first event.

The event notification method may further include displaying icons corresponding to the plurality of events. The command to select the first event among the plurality of events may be based on a selection of an icon corresponding to the first icon among the displayed icons.

Furthermore, according to embodiments of the present disclosure, an event notification method includes: sensing a command to select a first event among a plurality of events; generating a first vibration pattern corresponding to the selected first event; matching the generated first vibration pattern to the selected first event; and storing the generated first vibration pattern in a memory.

The event notification method may further include displaying graphic data corresponding to the first vibration pattern.

The first vibration pattern may be generated based on a command received through a user input unit, and the command received through the user input unit may include a command to select a vibration intensity.

The event notification method may further include establishing RF communication with a wearable device; sensing generation of the first event; and transmitting, to the wearable device, information stored in the memory relating to the first vibration pattern corresponding to the first event, upon sensing the generation of the first event.

Furthermore, according to embodiments of the present disclosure, a non-transitory computer readable medium containing program instructions for performing an event notification method includes: program instructions that sense a command to select a first event among a plurality of events; program instructions that generate a first vibration pattern corresponding to the selected first event; program instructions that match the generated first vibration pattern to the selected first event; and program instructions that store the generated first vibration pattern in a memory.

According to the present disclosure, a user can generate a vibration pattern corresponding to each event generated in a vehicle conveniently. In addition, a notification of an event can be provided through a wearable device paired with a vehicle using a generated vibration pattern corresponding to the event when the event is generated in the vehicle. The effects of the present disclosure are not limited to the above-described effects and other effects which are not described herein will become apparent to those skilled in the art from the following description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Reference will now be made in detail to the embodiments of the present disclosure, examples of which are illustrated in the accompanying drawings. The suffixes "module" and "unit" are used herein for convenience of description. Thus the suffixes "module" and "unit" can be used interchangeably and do not have any distinguishable meanings or functions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
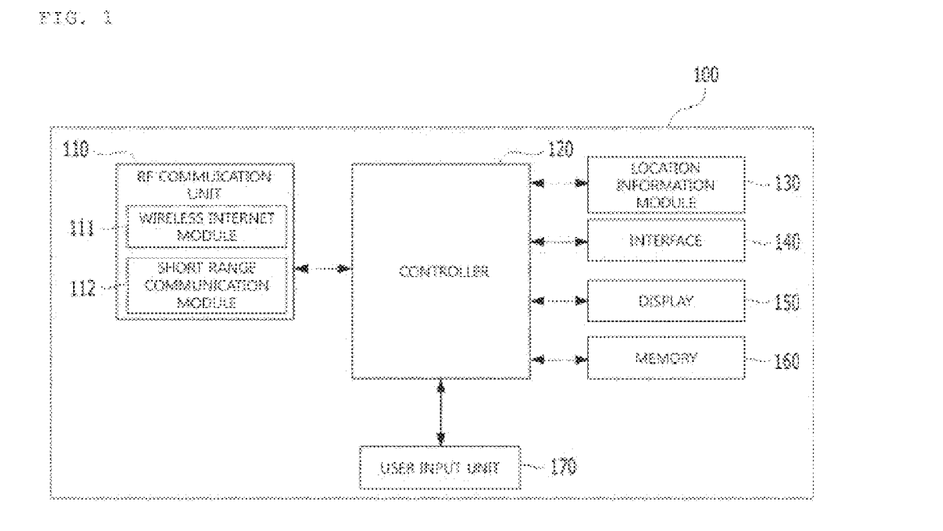
FIG. 1 is a block diagram illustrating component modules included in a vehicle according to embodiments of the present disclosure.

Referring now to the disclosed embodiments, FIG. 1 is a block diagram illustrating component modules included in a vehicle 100 according to embodiments of the present disclosure. Parts of the component modules included in the vehicle 100 may be built-in modules or component modules of an external device, which are added by a user.

As shown in FIG. 1, the vehicle 100 may include an RF communication unit 110, a controller 120, a location information module 130, an interface 140, a display 150, a memory 160 and a user input unit 170. However, the vehicle 100 may include a smaller or larger number of component modules than the shown component modules according to embodiments of the present disclosure. Further, two or more component modules shown in FIG. 1 may be implemented as one component module and one component module shown in FIG. 1 may be implemented as two or more component modules.

The RF communication unit 110 may enable RF communication with an external device. The RF communication unit 110 may include at least one of a wireless Internet module 111 and a short-range communication module 112.

The wireless Internet module 111 refers to a module for wireless Internet access and is configured to transmit and receive RF signals in communication networks according to wireless Internet technologies. Wireless Internet technologies may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), and the like.

The short-range communication module 112 is used for short-range communication and can support short-range communication using at least one of Bluetooth, Radio Frequency Identification (RFID), Infrared Data Association (IrDA), Ultra Wideband (UWB), ZigBee, Near Field Communication (NFC), Wi-Fi, Wi-Fi Direct, Wireless Universal Serial Bus (USB), and the like.

The location information module 130 is used to acquire location information of the vehicle 100. For example, the location information module 130 can detect the location of the vehicle 100 using a signal sent from a GPS satellite.

The interface 140 may include at least one of a port for connecting the vehicle with an external device and a port for connecting internal component modules.

The display 150 may output information processed by the controller 120. The display 150 may be composed of one of a liquid crystal display (LCD), a thin film transistor-liquid crystal display (TFT-LCD), an organic light-emitting diode (OLED), and the like.

The memory 160 may store programs, algorithms, applications and the like necessary for operations of the vehicle 100. The memory 160 may store a navigation program for road guide according to embodiments of the present disclosure.

The user input unit 170 is configured to receive user commands. When the display includes a touchscreen, the touchscreen may serve as the user input unit 170. The user input unit 170 may include buttons, wheels, switches and the like included in the vehicle 100 according to embodiments of the present disclosure.

The controller 120 may control operations of the component modules. In the present disclosure, component modules necessary to generate a vibration pattern corresponding to each event and to announce the corresponding event using the generated vibration pattern, from among the component modules of the vehicle 100, may be referred to as an event notification system. Part of the event notification system described in the present disclosure may be implemented by a navigation system, Audio-Video-Navigation (AVN) device, a mobile terminal (e.g., cellular phone, tablet PC, etc.), or the like.

A description will be given of a method for generating a vibration pattern corresponding to each event and a method for announcing the event using the generated vibration pattern in the event notification system with reference to FIGS. 3 and 4.

Figure 2:
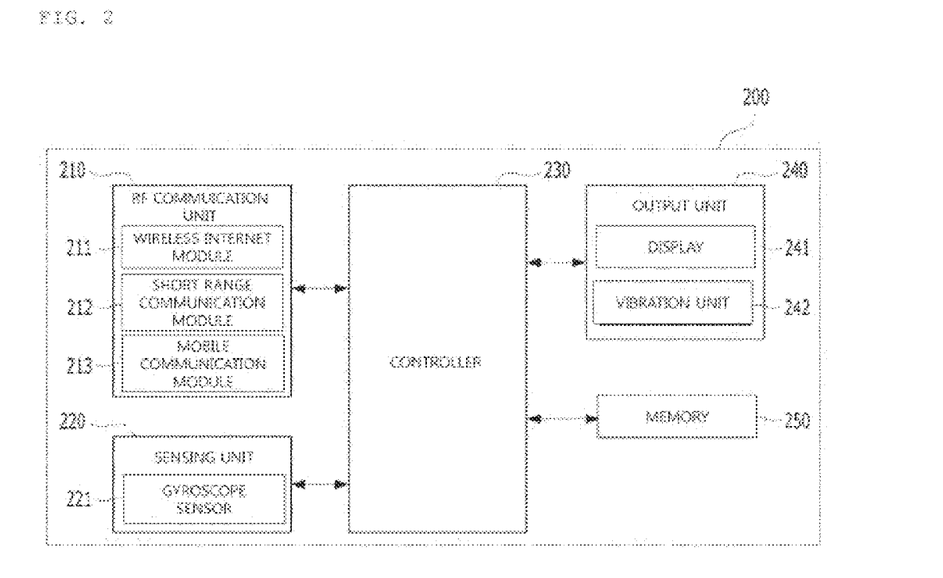
FIG. 2 is a block diagram illustrating component modules of a wearable device according to embodiments of the present disclosure.

FIG. 2 is a block diagram illustrating component modules of a wearable device 200 according to embodiments of the present disclosure.

A wearable device described in the present disclosure refers to a device that a user can wear and may include smart watches, smart glasses, a head mounted display (HMD), smart clothing, smart shoes, and the like.

As shown in FIG. 2, the wearable device 200 may include an RF communication unit 210, a sensing unit 220, a controller 230, an output unit 240 and a memory 250. However, the wearable device 200 may include a smaller or larger number of component modules than the shown component modules according to embodiments of the present disclosure. Further, two or more component modules shown in FIG. 2 may be implemented as one component module and one component module shown in FIG. 2 may be implemented as two or more component modules.

The RF communication unit 210 may enable RF communication with an external device. The RF communication unit 210 may include a wireless Internet module 211, a short-range communication module 212 and a mobile communication module 213. The wireless Internet module 212 and the short-range communication module 212 are similar to those described above with reference to FIG. 1 and thus detailed description thereof is omitted. The mobile communication module 213 may transmit/receive RF signals to/from at least one of a base station, an external terminal and a server on a mobile communication network constructed according to technical standards or communication schemes for mobile communication (e.g., Global System for Mobile (GSM) communication, Code Division Multi Access (CDMA), CDMA2000, Enhanced Voice-Data Optimized or Enhanced Voice-Data Only (EV-DO), Wideband CDMA (WCDMA), HSDPA, HSUPA, Long Term Evolution (LTE), Long Term Evolution-Advanced (LTE-A), etc.).

The sensing unit 220 may sense internal/external information of the wearable device 200. The sensing unit 220 may include a gyroscope sensor 221. The gyroscope sensor 221 can sense a motion of the wearable device 200, a state of the wearable device 200 and the like. According to embodiments of the present disclosure, the sensing unit 220 may further include a motion sensor, an acceleration sensor and the like.

The output unit 240 may include a display 241 and a vibration unit 242. The display 241 may output information processed by the controller 230. The vibration unit 242 generates predetermined vibration under the control of the controller 230. The output unit 240 may further include at least one of a sound output unit and a light output unit.

The memory 250 may store programs, algorithms, applications and the like necessary for operations of the wearable device 200.

The controller 230 may control operations of the component modules.

A description will be given of a method for generating a vibration pattern corresponding to each event and a method for announcing the event using the generated vibration pattern in the event notification system included in the vehicle 100 and the wearable device 200 with reference to FIGS. 5 to 8.

An event described in the specification is an event that may be generated in a vehicle and may refer to road guide information (e.g., left turn, right turn, U-turn, arrival at a destination, and the like) generated in a navigation system, information generated in association with vehicle safety (e.g., using no safety belt, oil exchange, door open, speeding, and the like), reception of a call signal or a text signal in a mobile terminal (e.g., cellular phone, tablet, PC, and the like) paired with the vehicle, or the like.

Figure 3:
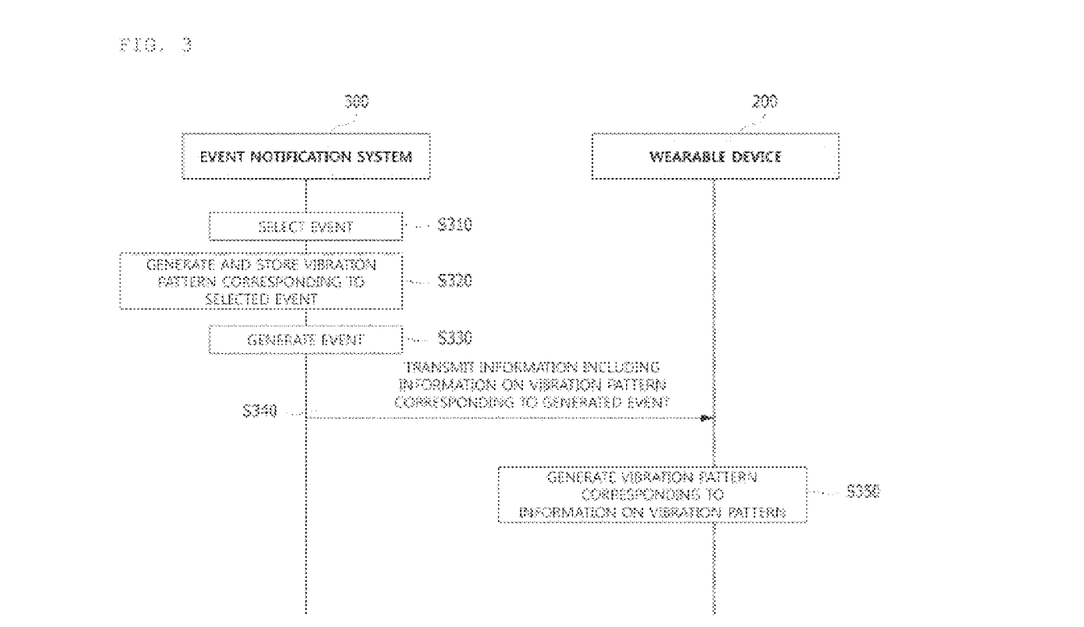
FIG. 3 is a flowchart illustrating an exemplary event notification method according to embodiments of the present disclosure.

FIG. 3 is a flowchart illustrating an exemplary event notification method according to embodiments of the present disclosure.

The controller 120 of the event notification system 300 detects a command for selecting a first event from among a plurality of events (S310). According to embodiments of the present disclosure, the controller 120 may display icons related to the plurality of events on the display 150 and detect a command for selecting an icon corresponding to the first event from among the displayed icons. A user may select the first event by touching the icon corresponding to the first event when the display 150 includes a touchscreen or select the first event through the user input unit 170 such as a switch, a button or the like.

The controller 120 generates a first vibration pattern corresponding to the selected first event, matches the generated first vibration pattern to the first event and stores the first vibration pattern in the memory 160 (S320).

The controller 120 may generate the first vibration pattern on the basis of a command received through the user input unit 170. For example, the user can generate the first vibration pattern by pressing a specific button of the user input unit 170, which is related to vibration pattern generation. Specifically, the user can generate the first vibration pattern corresponding to the first event by varying a time for which the specific button is pressed, pressure at which the specific button is pressed, an angle at which specific button is rotated, a direction in which the specific button is rotated and the like. The memory 160 may prestore vibration patterns according to operations of the user input unit 170. Commands received through the user input unit 170 may include a command for selecting vibration intensity.

According to embodiments of the present disclosure, the controller 120 may display a guide message for indicating that a desired vibration pattern can be generated by operating the user input unit 170 to the user, on the display 150. Furthermore, the controller 120 may output graphic data corresponding to the generated first vibration pattern through the display 150. The user can confirm whether a desired vibration pattern has been correctly generated using the graphic data.

The controller 120 may map the generated first vibration pattern with the first event and store the first vibration pattern in the memory 160. The user may repeat the steps S310 and S320 of selecting an event for which a vibration pattern will be set from among the plurality of events and generating a vibration pattern corresponding to the selected event.

The controller 120 senses generation of the first event (S330). For example, when the first event corresponds to "left turn" from among road guide information generated in a navigation device, the controller 120 can sense generation of "left turn" event during road guide through the navigation device.

The controller 120 senses the wearable device 200 linked to the RF communication unit 110 for RF communication and transmits a signal including information on the first vibration pattern corresponding to the first event to the sensed wearable device 200 through the RF communication unit 110 (S340). The controller 120 may extract the information on the first vibration pattern corresponding to the first event from among vibration patterns stored in the memory 160 and transmit a signal including information on the extracted first vibration pattern to the wearable device 200.

The controller 230 of the wearable device 200 may receive the signal including the information on the first vibration pattern through the RF communication unit 210 and the vibration unit 242 can generate vibration on the basis of the information on the first vibration pattern, included in the first vibration pattern (S350). Since the user remembers the generated first vibration corresponding to the first event, the user can immediately recognize generation of the first event through the wearable device 200 that the user wears without checking the display 150 of the vehicle.

Figure 4:
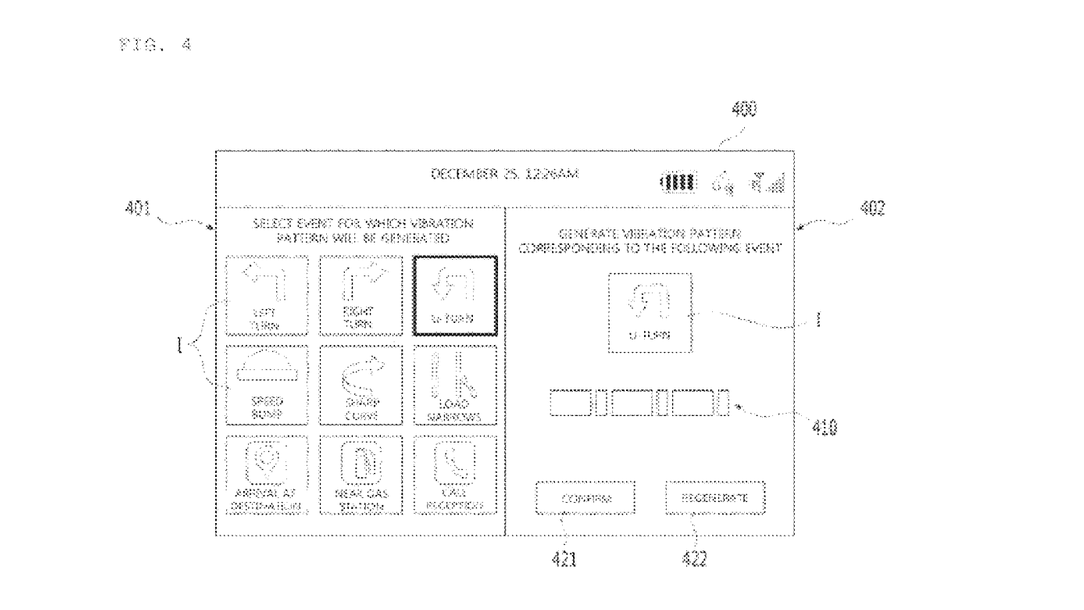
FIG. 4 is a view illustrating an exemplary method for generating a vibration pattern according to embodiments of the present disclosure.

FIG. 4 is a view illustrating an exemplary method for generating a vibration pattern according to embodiments of the present disclosure.

The controller 120 of the event notification system 300 may display a screen 400 for generating a vibration pattern on the display 150 when a menu for generating a vibration pattern is selected. The screen 400 may include icons I related to a plurality of events. The controller 120 senses a command for selecting an icon I corresponding to a specific event (e.g., "U-turn" event) from among the displayed icons I.

When the icon I corresponding to the specific event is selected, the controller 120 may display a message for generating a vibration pattern corresponding to the specific event on the display 150. According to embodiments of the present disclosure, the screen 400 may include a first area 401 for displaying the icons I related to the plurality of events and a second area 402 for displaying the message for generating the vibration pattern corresponding to the specific event when the icon I corresponding to the specific event is selected.

The controller 120 may generate the vibration pattern corresponding to the specific event on the basis of a command received through the user input unit 170. In addition, the controller 120 may display graphic data 410 corresponding to the generated vibration pattern on the display 150.

When the graphic data 410 corresponds to a vibration pattern intended by the user, the user may select a confirmation button 421. When the graphic data 410 does not correspond to the vibration pattern intended by the user, the user may select a menu 422 for regenerating a vibration pattern.

The controller 120 may map the generated vibration pattern to the specific event and store the vibration pattern in the memory 160 upon selection of the confirmation button 421. The screen composition for generating a vibration pattern, shown in FIG. 4, is exemplary and the present disclosure is not limited thereto.

Figure 5:
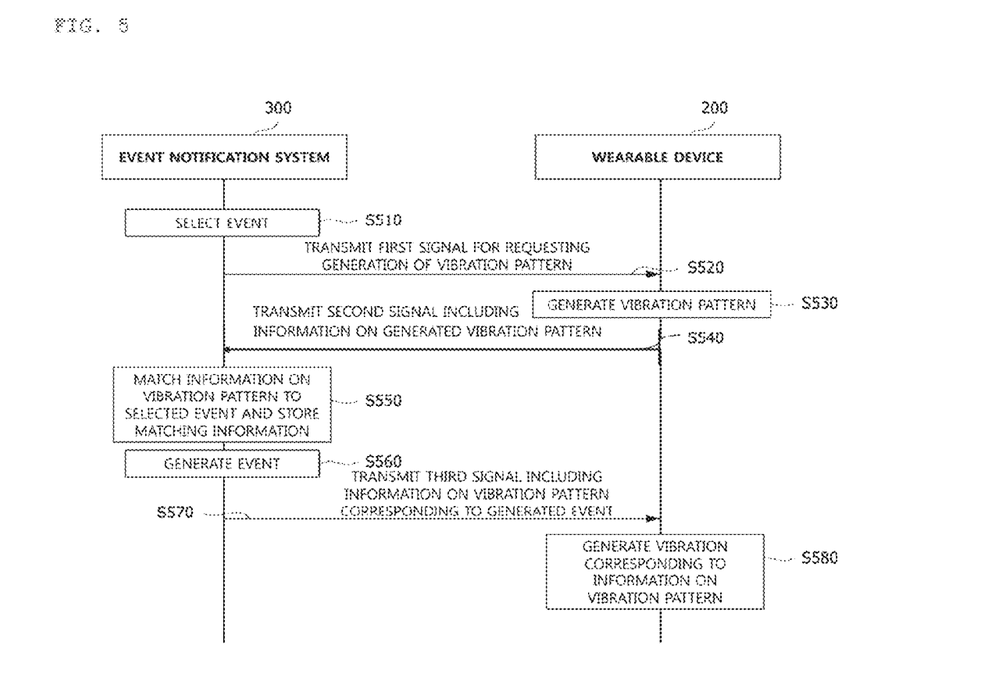
FIG. 5 is a flowchart illustrating an exemplary event notification method according to embodiments of the present disclosure.

FIG. 5 is a flowchart illustrating an exemplary event notification method according to embodiments of the present disclosure. Redundant parts in the description of the event notification method of FIG. 3 are omitted and a difference between the methods of FIGS. 3 and 5 will now be described.

Alternatively, a vibration pattern may be generated by the wearable device instead of the event notification system included in the vehicle. Referring to FIG. 5, the controller 120 of the event notification system 300 senses a command for selecting the first event from among a plurality of events (S510).

The controller 120 of the event notification system 300 controls the RF communication unit 110 to transmit a first signal for requesting generation of a vibration pattern to the wearable device 200 (S520). Specifically, the controller 120 of the event notification system 300 senses the wearable device 200 linked to the RF communication unit 110 for RF communication and controls the RF communication unit 110 to transmit the first signal for generating generation of a vibration pattern to the wearable device 200. The first signal may not include information on the selected event.

The controller 230 of the wearable device 200 generates a first vibration pattern 530 (S530). For example, the controller 230 of the wearable device 200 can sense a motion of the wearable device 200 using the gyroscope sensor 221 included in the sensing unit 220 and generate the first vibration pattern using a predetermined vibration pattern corresponding to the sensed motion of the wearable device 200. The memory 250 of the wearable device 200 may prestore mapping data between motions of the wearable device 200 and predetermined vibration patterns.

Figure 6:
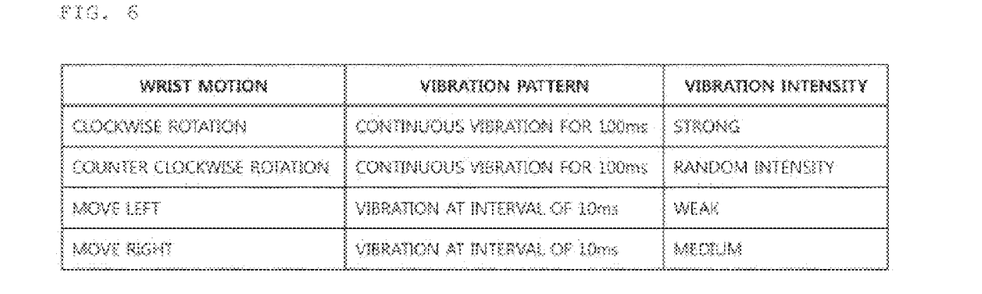
FIG. 6 is a view illustrating exemplary mapping data between motions of a wearable device and predetermined vibration patterns according to embodiments of the present disclosure.

FIG. 6 is a view illustrating exemplary mapping data between motions of the wearable device 200 and predetermined vibration patterns according to embodiments of the present disclosure.

As shown in FIG. 6, the memory 250 of the wearable device 200 may prestore mapping data between motions (e.g., a wrist motion) of the wearable device 200 and predetermined vibration patterns. According to embodiments of the present disclosure, the memory 250 of the wearable device 200 may prestore mapping data among motions of the wearable device 200, predetermined vibration patterns and predetermined vibration intensities.

For example, when a clockwise movement of the wearable device 200 is mapped to a vibration pattern that continuously vibrates for 100 ms and a vibration intensity greater than a predetermined level and stored in the memory 250, the controller 230 can generate the first vibration pattern that continuously vibrates for 300 ms with a vibration intensity greater than the predetermined level upon sensing clockwise rotation of the wearable device 200 three times using the gyroscope sensor 221 included in the sensing unit 220.

The controller 230 of the wearable device 200 may output the mapping data between motions of the wearable device 200 and the predetermined vibration patterns to the display 241 such that the user can refer to the mapping data when generating a vibration pattern. Alternatively, the mapping data between motions of the wearable device 200 and the predetermined vibration patterns may be stored in the memory 160 of the event notification system 300 and output to the display 150 of the event notification system 300 such that the user can refer to the mapping data when generating a vibration pattern using the wearable device 200.

Referring back to FIG. 5, the controller 230 of the wearable device 200 may generate vibration through the vibration unit 242 on the basis of the first vibration pattern upon generation of the first vibration pattern such that the user can confirm whether the desired vibration pattern has been correctly generated. The controller 230 of the wearable device 200 controls the RF communication unit 210 to transmit a second signal including information on the generated first vibration pattern to the event notification system 300 (S540).

The controller 120 of the event notification system 300 receives the second signal through the RF communication unit 110, matches the first vibration pattern corresponding to the information included in the received second signal to the first event and stores the first vibration pattern in the memory 160 (S550).

According to embodiments of the present disclosure, the controller 120 of the event notification system 300 may output graphic data corresponding to the first vibration pattern to the display 150. The user can confirm whether the desired vibration pattern has been correctly generated using the graphic data.

The user may repeat the steps S510, S520, S530, S540 and S550 of selecting an event for which a vibration pattern will be set from among the plurality of events and generating the vibration pattern corresponding to the selected event.

The controller 120 of the event notification system 300 senses generation of the first event (560). For example, when the first event corresponds to "left turn" from among road guide information generated in the navigation device, the controller 120 can sense generation of "left turn" event during road guide through the navigation device.

The controller 120 of the event notification system 300 senses the wearable device 200 linked to the RF communication unit 110 for RF communication and transmits a signal including information on the first vibration pattern corresponding to the first event to the sensed wearable device 200 through the RF communication unit 110 (S570). The controller 120 of the event notification system 300 may extract the information on the first vibration pattern corresponding to the first event from among vibration patterns stored in the memory 160 and transmit the signal including the extracted information on the first vibration pattern to the wearable device 200.

The controller 230 of the wearable device 200 may receive the signal including the information on the first vibration pattern through the RF communication unit 210 and generate vibration through the vibration unit 242 on the basis of the information on the first vibration pattern, included in the received signal (S580).

Since the user remembers the generated first vibration corresponding to the first event, the user can immediately recognize generation of the first event through the wearable device 200 that the user wears without checking the display 150 of the vehicle. In addition, according to embodiments of the present disclosure, the user can conveniently generate a desired vibration pattern using the gyroscope sensor included in the wearable device 200.

Figure 7:
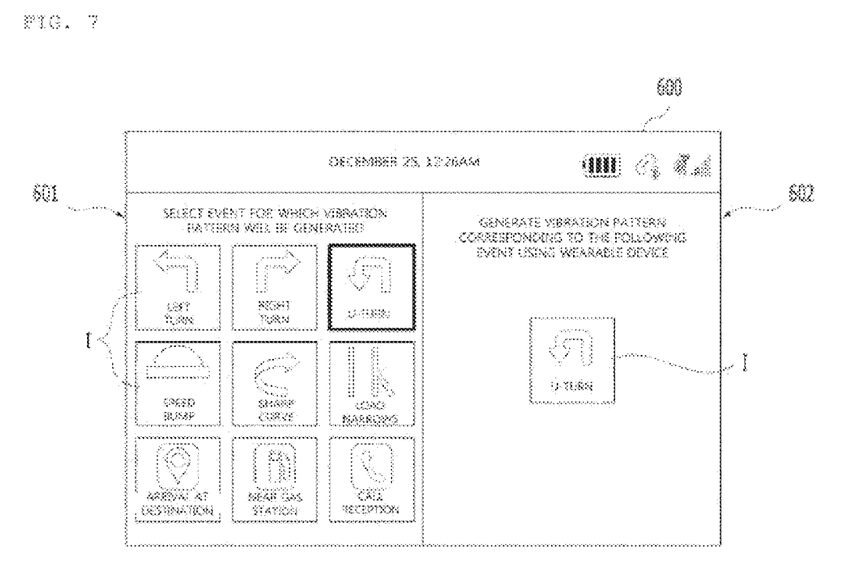
FIGS. 7 and 8 are views illustrating an exemplary method for generating a vibration pattern according to embodiments of the present disclosure.
Figure 8:
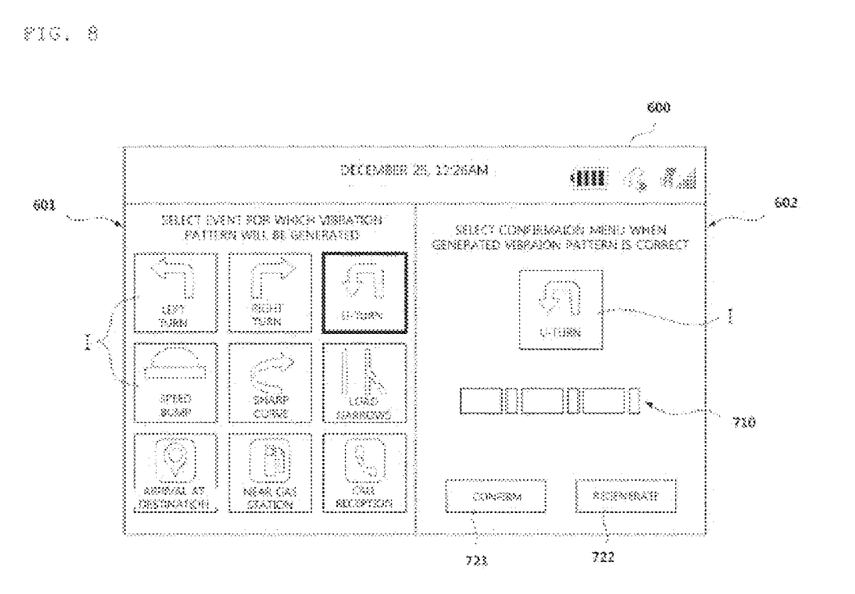

FIGS. 7 and 8 are views illustrating an exemplary method for generating a vibration pattern according to embodiments of the present disclosure. In the present embodiments, it is assumed that the vehicle and the wearable device 200 are paired.

As shown in FIG. 7, the controller 120 of the event notification system 300 may display a screen 600 for generating a vibration pattern on the display 150 upon selection of a menu for generating a vibration pattern. The screen 600 may include icons I related to a plurality of events. The controller 120 senses a command for selecting an icon I corresponding to a specific event (e.g., "U-turn" event) from among the displayed icons I. The controller 120 of the event notification system 300 controls the RF communication unit 110 to transmit a first signal for requesting generation of a vibration pattern to the wearable device 200 upon selection of the icon I corresponding to the specific event. In addition, the controller 120 of the event notification system 300 may display a message for generating a vibration pattern using the wearable device through the display 150 upon selection of the icon I corresponding to the specific event. According to embodiments of the present disclosure, the screen 600 may include a first area for displaying the icons I related to the plurality of events and a second area 602 for displaying a message for generating a vibration pattern using the wearable device 200.

The user may generate a vibration pattern corresponding to the specific event using the wearable device 200. The controller 230 of the wearable device 200 may sense a motion of the wearable device 200 using the gyroscope sensor 221 included in the sensing unit 220 and generate the vibration pattern corresponding to the specific event using a predetermined vibration pattern corresponding to the sensed motion of the wearable device 200. In addition, the controller 230 of the wearable device 200 controls the RF communication unit 210 to transmit a second signal including information on the generated vibration pattern to the event notification system 300.

As shown in FIG. 8, the controller 120 of the event notification system 300 may receive the second signal through the RF communication unit 110 and display graphic data 710 corresponding to the generated vibration pattern on the display 150 on the basis of the information included in the received second signal. The user may select a confirmation button 721 when the graphic data 710 corresponds to a vibration pattern intended by the user and select a menu 722 for regenerating a vibration pattern when the graphic data 710 differs from the intended vibration pattern.

Upon selection of the confirmation button 721, the controller 120 of the event notification system 300 may map the generated vibration pattern to the specific event and store the vibration pattern in the memory 160. The screen compositions for generating a vibration pattern, shown in FIGS. 7 and 8, are exemplary and the present disclosure is not limited thereto.

While above description is based on the assumption that the event notification system 300 and the wearable device 200 are directly paired and perform RF communication, communication may be performed between the event notification system 300 and the wearable device 200 in such a manner that the event notification system 300 and a mobile terminal (e.g., cellular phone, tablet, PC, or the like) are paired to perform RF communication, the mobile terminal and the wearable device 200 are paired to perform RF communication, and the mobile terminal transmits or delivers a signal received from the event notification system 300 to the wearable device 200 and transmits or delivers a signal received from the wearable device 200 to the event notification system 300.

According to the present disclosure, it is possible to provide a solution by which the user can conveniently generate a vibration pattern corresponding to each event generated in the vehicle and event notification is provided through the wearable device paired with the vehicle using the generated vibration pattern when the corresponding event is generated in the vehicle. The embodiments of the present disclosure may be implemented as a code that can be written to a processor-readable recording medium and can thus be read by a processor.

The above-described event notification method and apparatus therefor are not limited to the configurations of the above-described embodiments and various modifications may be made by selectively combining all or some of the above-described embodiments. The embodiments disclosed herein are intended to cover various modifications and equivalent arrangements included within the spirit and scope of the appended claims.

What is claimed is:

1. An event notification system, comprising:
a communication unit;
a controller that senses a command to select a first event among a plurality of events and controls the communication unit such that the communication unit establishes RF communication with a wearable device and transmits, to the wearable device, a first signal requesting generation of a vibration pattern corresponding to the first event, upon sensing generation of the first event and receiving a second signal including information relating to a generated first vibration pattern from the wearable device; and
a memory that stores the generated first vibration pattern corresponding to the first event.

2. The event notification system of claim 1, wherein the controller displays graphic data corresponding to the first vibration pattern on a display when the first vibration pattern is generated.

3. The event notification system of claim 1, wherein the controller transmits the information relating to the first vibration pattern to the wearable device based on a command received through a user input unit.

4. The event notification system of claim 1, wherein the controller displays a guide message on a display for generating the first vibration pattern corresponding to the first event when the first event is selected.

5. The event notification system of claim 3, wherein the command received through the user input unit includes a command to select a vibration intensity.

6. The event notification system of claim 1, wherein:
the controller senses a command to select a second event among the plurality of events and transmits, to the wearable device, information stored in the memory relating to a second vibration pattern corresponding to the second event, upon sensing generation of the second event,
wherein the second vibration pattern differs from the first vibration pattern.

7. The event notification system of claim 1, wherein:
the controller displays icons corresponding to the plurality of events on a display, and
the command to select the first event among the plurality of events is based on a selection of an icon corresponding to the first event among the displayed icons.

8. An event notification method, comprising:
establishing RF communication with a wearable device;
sensing a command to select a first event among a plurality of events;
transmitting a first signal requesting generation of a vibration pattern to the wearable device;
receiving a second signal including information relating to a generated first vibration pattern from the wearable device;
matching the generated first vibration pattern to the selected first event; and
storing the generated first vibration pattern in a memory.

9. The event notification method of claim 8, further comprising displaying graphic data corresponding to the first vibration pattern.

10. The event notification method of claim 8, wherein the wearable device stores mapping data that maps motions of the wearable device, sensed through a gyroscope sensor, to predetermined vibration patterns.

11. The event notification method of claim 8, further comprising displaying a guide message for generating the first vibration pattern corresponding to the first event when the first event is selected.

12. The event notification method of claim 8, further comprising:
sensing a command to select a second event among the plurality of events;
transmitting a third signal requesting generation of a vibration pattern to the wearable device;
receiving a fourth signal including information relating to a generated second vibration pattern from the wearable device;

matching the generated second vibration pattern to the selected second event; and storing the generated second vibration pattern in the memory, wherein the second vibration pattern differs from the first vibration pattern.

13. The event notification method of claim 8, further comprising:

sensing generation of the first event; and transmitting, to the wearable device, information stored in the memory relating to the first vibration pattern corresponding to the first event, upon sensing the generation of the first event.

14. The event notification method of claim 8, further comprising displaying icons corresponding to the plurality of events, wherein the command to select the first event among the plurality of events is based on a selection of an icon corresponding to the first icon among the displayed icons.

15. A non-transitory computer readable medium containing program instructions for performing an event notification method, the computer readable medium comprising:

program instructions that establish RF communication with a wearable device;

program instructions that sense a command to select a first event among a plurality of events;

program instructions that transmit a first signal requesting generation of a vibration pattern to the wearable device;

program instructions that receive a second signal including information relating to a generated first vibration pattern from the wearable device; and program instructions that store the generated first vibration pattern corresponding to the selected first event in a memory.

* * * * *